US007744453B2

(12) United States Patent
Pacey

(10) Patent No.: US 7,744,453 B2
(45) Date of Patent: Jun. 29, 2010

(54) GAMING MACHINE WITH HISTORY DISPLAY

(75) Inventor: Larry J. Pacey, Prospects Heights, IL (US)

(73) Assignee: WMS Gaming, Inc., Waukegan, IL (US)

( * ) Notice: Subject to any disclaimer, the term of this patent is extended or adjusted under 35 U.S.C. 154(b) by 1872 days.

(21) Appl. No.: 10/375,675

(22) Filed: Feb. 26, 2003

(65) Prior Publication Data

US 2004/0053662 A1 Mar. 18, 2004

Related U.S. Application Data

(63) Continuation-in-part of application No. 10/242,014, filed on Sep. 12, 2002, now abandoned.

(51) Int. Cl.

| | |
|---|---|
| ***A63F 9/24*** | (2006.01) |
| ***A63F 13/00*** | (2006.01) |
| ***A63F 1/00*** | (2006.01) |
| ***A63F 1/18*** | (2006.01) |
| ***G06F 17/00*** | (2006.01) |
| ***G06F 19/00*** | (2006.01) |
| ***A63B 71/00*** | (2006.01) |

(52) U.S. Cl. ............................ 463/16; 463/17; 463/20; 463/29; 273/138.1; 273/139

(58) Field of Classification Search ..................... 463/1, 463/16–30, 40, 42, 43, 46; 273/138.1, 139
See application file for complete search history.

(56) References Cited

U.S. PATENT DOCUMENTS

| | | | | |
|---|---|---|---|---|
| 5,197,736 | A * | 3/1993 | Backus et al. | 273/142 R |
| 5,848,936 | A * | 12/1998 | Morrison | 463/17 |
| 5,851,148 | A | 12/1998 | Brune et al. | 463/25 |
| 5,857,909 | A | 1/1999 | Rubin | 463/17 |
| 6,001,016 | A * | 12/1999 | Walker et al. | 463/42 |
| 6,012,983 | A * | 1/2000 | Walker et al. | 463/20 |
| 6,068,552 | A | 5/2000 | Walker et al. | 463/21 |
| 6,120,031 | A | 9/2000 | Adams | 273/292 |
| 6,190,255 | B1 | 2/2001 | Thomas et al. | 463/20 |
| 6,311,976 | B1 * | 11/2001 | Yoseloff et al. | 273/138.2 |
| 6,361,437 | B1 * | 3/2002 | Walker et al. | 463/23 |
| 6,364,313 | B1 * | 4/2002 | Moody | 273/138.1 |
| 6,416,406 | B1 * | 7/2002 | Duhamel | 463/12 |
| 6,746,328 | B2 * | 6/2004 | Cannon et al. | 463/17 |
| 6,913,262 | B2 * | 7/2005 | Berman | 273/292 |
| 2003/0100361 | A1 * | 5/2003 | Sharpless et al. | 463/25 |
| 2003/0224847 | A1 * | 12/2003 | Jaimet | 463/16 |

(Continued)

OTHER PUBLICATIONS

The American Heritage Dictionary. Third Edition. Version 3.6a. Copyright © 1994 SoftKey International Inc.*

(Continued)

*Primary Examiner*—Dmitry Suhol
*Assistant Examiner*—Binh-An D Nguyen
(74) *Attorney, Agent, or Firm*—Nixon Peabody LLP

(57) ABSTRACT

A gaming system comprises a history display and a controller. The history display tracks a plurality of past outcomes of a wagering game. The controller awards a bonus if a current outcome of the wagering game has a predetermined association with at least one of the displayed plurality of past outcomes.

8 Claims, 7 Drawing Sheets

U.S. PATENT DOCUMENTS

| | | | | |
|---|---|---|---|---|
| 2003/0224852 | A1 * | 12/2003 | Walker et al. | 463/20 |
| 2003/0228902 | A1 * | 12/2003 | Walker et al. | 463/25 |
| 2004/0224748 | A1 * | 11/2004 | Cannon et al. | 463/16 |

OTHER PUBLICATIONS

Dictionary p. 83, "any".*
Product Sheet for Monopoly® Chairman of the Board™ (Reel), WMS Gaming Inc., 2 pages (1999).
Product Sheet for Monopoly® Chairman of the Board™ (Video), WMS Gaming Inc., 1 page (no date).
Product Sheet for Boom™ Video*, WMS Gaming Inc., 1 page (1998).
Product Sheet for XFactor™, WMS Gaming Inc., 2 pages (1997).
Brochure for Multi-Pay™ Plus, WMS Gaming Inc., 4 pages (1997).
Reproduction of Game Glass for Shopping Spree, WMS Gaming Inc., 1 page (no date).

* cited by examiner

GAMING MACHINE WITH HISTORY DISPLAY

REFERENCE TO RELATED APPLICATIONS

This application is a continuation-in-part of U.S. application Ser. No. 10/242,014, filed Sep. 12, 2002, now abandoned and entitled "Gaming Machine With History Display." This application is related to U.S. application Ser. No. 10/077,667, filed Feb. 15, 2002, and entitled "Gaming Machine With Block Wagering."

FIELD OF THE INVENTION

The present invention relates generally to gaming machines and, more particularly, to a gaming machine for awarding a bonus if a current game outcome has a predetermined association with at least one of a displayed plurality of past outcomes.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome of the basic game. Because the bonus game concept offers tremendous advantages in player appeal and excitement relative to other known games, and because such games are attractive to both players and operators, there is a continuing need to develop new features and themes for bonus games to satisfy the demands of players and operators. Preferably, such new bonus game features and themes will maintain, or even further enhance, the level of player excitement offered by bonus games heretofore known in the art. The present invention is directed to satisfying these needs.

SUMMARY OF THE INVENTION

Accordingly, the present invention is directed to a gaming system including a history display and a controller. The history display tracks a plurality of past outcomes of a wagering game. The controller awards a bonus if a current outcome of the wagering game has a predetermined association with at least one of the displayed plurality of past outcomes.

BRIEF DESCRIPTION OF THE DRAWINGS

The foregoing and other advantages of the invention will become apparent upon reading the following detailed description and upon reference to the drawings.

Figure 1:
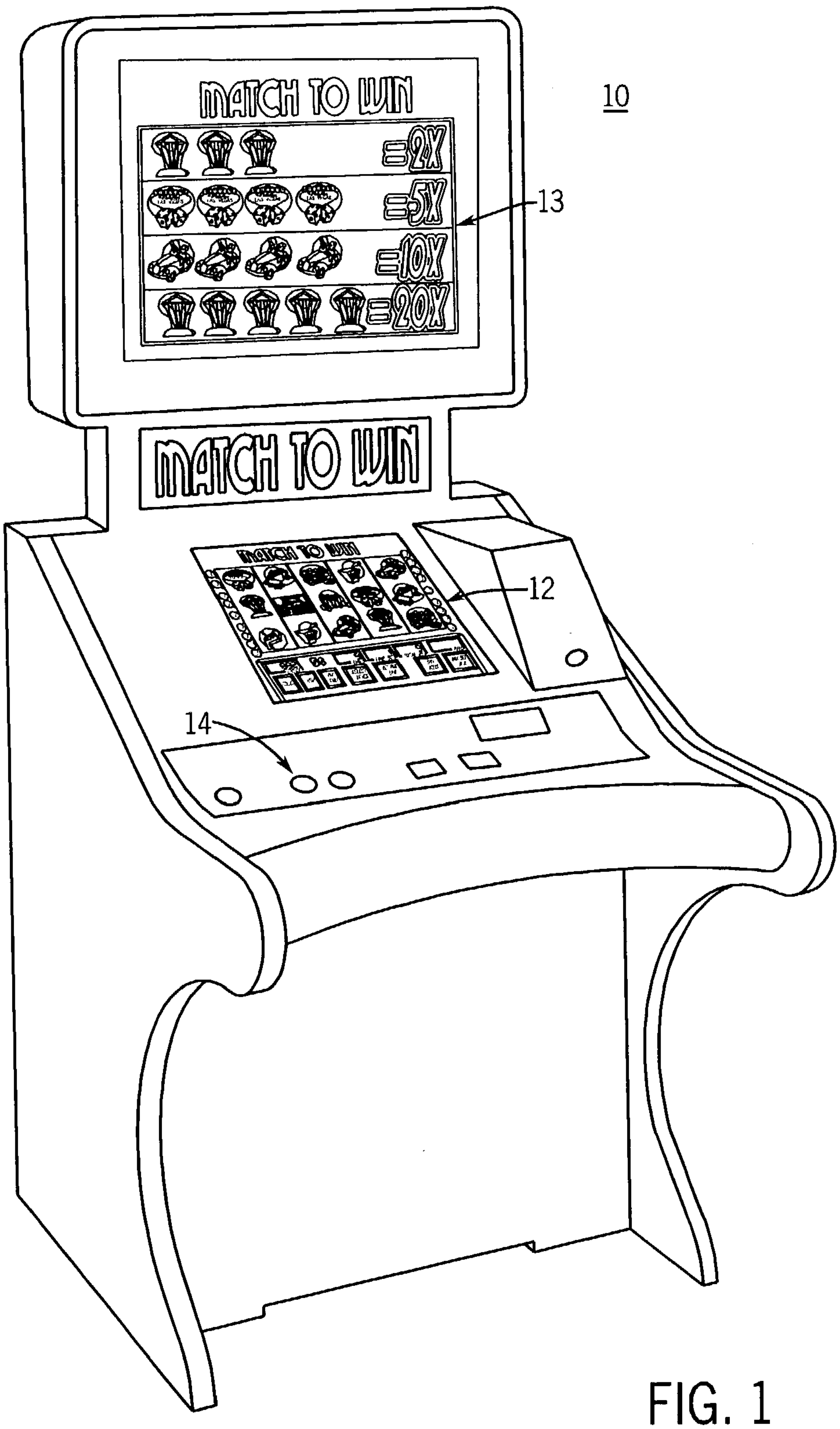
FIG. 1 is an isometric view of a gaming machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings, FIG. 1 depicts a gaming machine 10 operable to conduct a wagering game such as slots, poker, keno, bingo, blackjack, and lottery-type games. In operation, the gaming machine receives a wager from a player to purchase a "play" of the game. In a "play" of the game, the gaming machine generates at least one random event using a random number generator (RNG) and provides an award to the player for a winning outcome of the random event. The random event(s) varies with the type of wagering game conducted on the gaming machine.

The gaming machine 10 includes a primary video display 12 such as a CRT, LCD, plasma, or other type of video display known in the art. The display 12 is optionally overlaid with a touch screen to facilitate interaction with the player. In the illustrated embodiment, the gaming machine 10 is a "slant-top" version in which the display 12 is slanted at an angle toward the player of the gaming machine 10. Alternatively, the gaming machine 10 may be an "upright" version in which the display 12 is oriented vertically relative to the player. In addition to the display 12, the gaming machine 10 may include a secondary video display 13 mounted to and extending upward from a rear portion of the machine cabinet. If the wagering game includes both a basic game and a bonus feature (as in the present invention), the primary display 12 is primarily used to depict the basic game, and the secondary display 13 is primarily used to depict the bonus feature.

Figure 2:
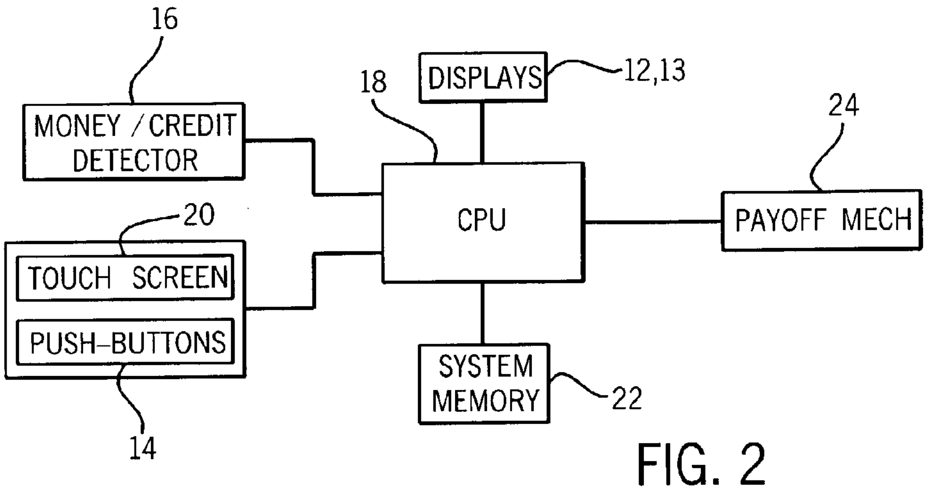
FIG. 2 is a block diagram of a control system suitable for operating the gaming machine.

FIG. 2 is a block diagram of a control system suitable for operating the gaming machine 10. Money/credit detector 16 signals a central processing unit (CPU) 18 when a player has inserted money or played a number of credits. The money may be provided by coins, bills, tickets, coupons, cards, etc. Using a button panel 14 (see FIG. 1) or the touch screen 20, the player may select any variables associated with the wagering game and place his/her wager to purchase a play of the game. In a play of the game, the CPU 18 generates at least one random event using a random number generator (RNG) and provides an award to the player for a winning outcome of the random event. If the wagering game includes a basic game and a bonus feature, the primary display 12 is primarily used to represent the random events and outcomes associated with the basic game, and the secondary display 13 is primarily used to represent the random events and outcomes associated with bonus game. In addition to the CPU 18, the control system may include one or more additional slave control units for operating one or more of the displays 12 and 13.

A system memory 22 stores control software, operational instructions and data associated with the gaming machine 10. In one embodiment, the system memory 22 comprises a separate read-only memory (ROM) and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 18 to award a payoff to the player. The payoff may, for example, be in the form of a number of credits. The number of credits are determined by one or more math tables stored in the system memory 22.

In accordance with the present invention, the gaming machine 10 may track and display a predetermined or variable number of past outcomes and integrate such outcomes into the play of the game. The present invention is described below in the context of a wagering game including a basic video slot game and a "match to win" bonus feature. It should, however, be understood, that the invention can also be applied to other wagering games.

Figure 3:
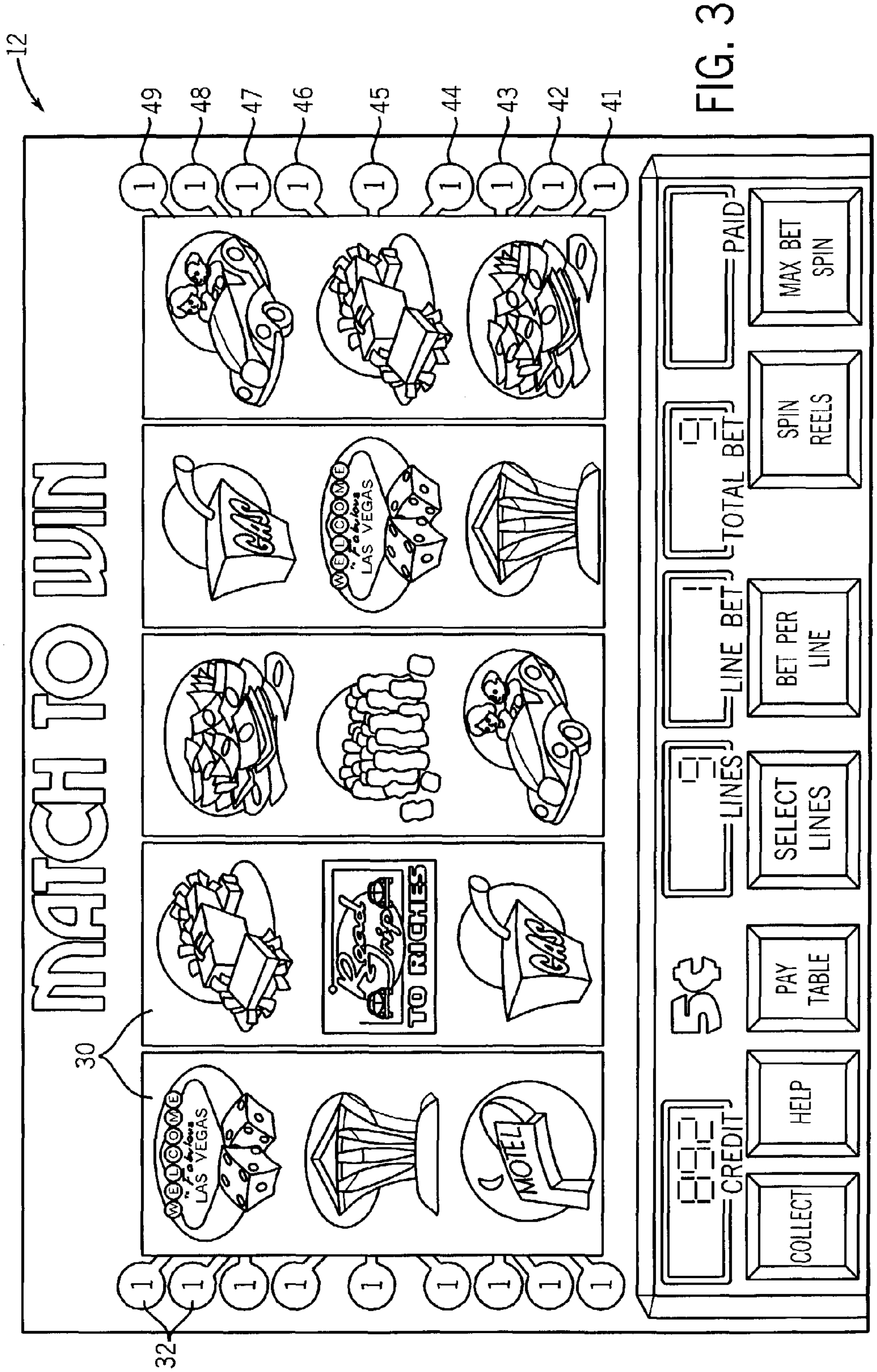
FIG. 3 is a display image on a primary display showing a basic slot game conducted on the gaming machine.

Referring to FIG. 3, the video slot game is implemented on the video display 12 on a number of video simulated spinning reels 30 with a number of pay lines 32. Each of the pay lines 32 extends through one symbol on each of the reels 30. Generally, game play is initiated by inserting money or playing a number of credits, causing the CPU to activate a number of pay lines corresponding to the amount of money or number of credits played. In one embodiment, the player selects the number of pay lines to play by pressing a "Select Lines" touch key on the display 12. The player then chooses the number of coins or credits to bet on the selected pay lines by pressing a "Bet Per Line" touch key.

After activation of the pay lines, the reels 30 may be set in motion by pressing a "Spin Reels" touch key or, if the player wishes to bet the maximum amount per line, by using a "Max Bet Spin" touch key on the display 12. Alternatively, other mechanisms such as a lever or push button may be used to set the reels in motion. The CPU uses a random number generator to select a game outcome (e.g., "basic" game outcome) corresponding to a particular set of reel "stop positions." The CPU then causes each of the reels 30 to stop at the appropriate stop position. Video symbols are displayed on the reels 30 to graphically illustrate the reel stop positions and indicate whether the stop positions of the reels 30 represent a winning game outcome.

Winning basic game outcomes (e.g., symbol combinations resulting in payment of coins or credits) are identifiable to the player by a pay table. In one embodiment, the pay table is affixed to the machine 10 and/or displayed by the display 12 in response to a command by the player (e.g., by pressing a "Pay Table" touch key). A winning basic game outcome occurs when the symbols appearing on the reels 30 along an active pay line correspond to one of the winning combinations on the pay table. A winning combination, for example, could be three or more matching symbols along an active pay line, where the award is greater as the number of matching symbols along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing a "Collect" touch key. In one implementation, the winning combinations start from the first reel (left to right) and span adjacent reels. In an alternative implementation, the winning combinations start from either the first reel (left to right) or the fifth reel (right to left) and span adjacent reels.

In accordance with the present invention, the gaming machine may track a predetermined number (e.g., four) of past winning symbol combinations, display the past winning combinations on the secondary video display 13, and provide a "repeat win" or "match to win" bonus to the player if a current play of the game yields one of the past winning combinations shown on the secondary display 13. The "repeat win" bonus may, for example, be a secondary game feature, a credit amount, or a bonus multiplier (i.e., multiplication of the normal payout for the winning combination by the multiplier). Past winning combinations may enter and leave the secondary display 13 in a first-in, first-out (FIFO) scheme, random scheme, or a ranked/priority scheme where winning combinations remain on the display 13 for different periods of time based on such factors as probability of occurrence, payout value, previous "repeat win" bonuses, etc. A past winning combination on the secondary display 13 may be immediately removed from the display 13 in response to a "repeat win" bonus involving that combination, or may remain on the display 13 until removed by virtue of normal operation of the selected scheme. After a player terminates his/her game session, the secondary display 13 may continue to display the past winning combinations that were displayed just prior to session termination, may be reset to display no past winning combinations, or may display a predetermined or random starting set of winning combinations.

Figure 4:
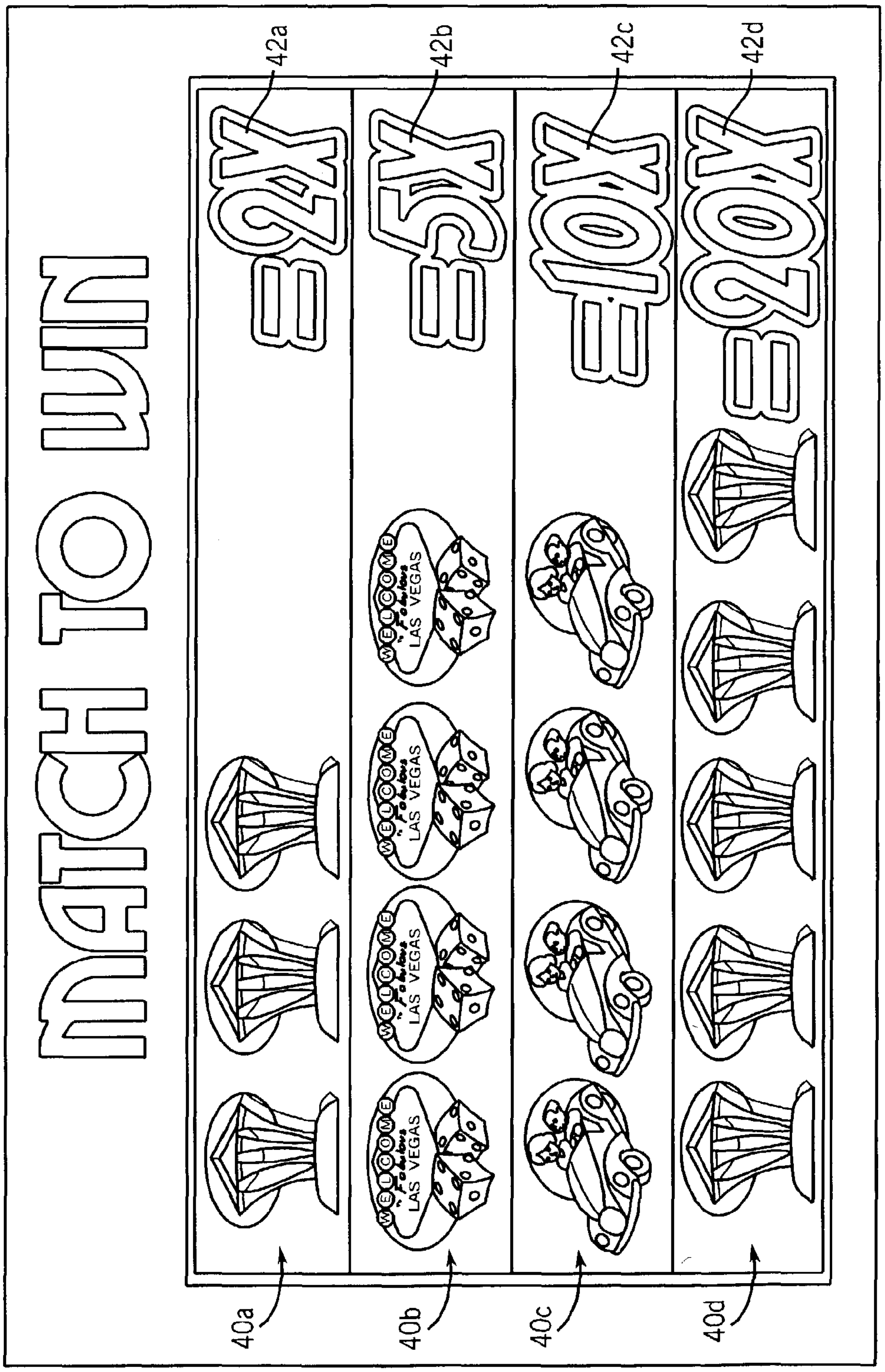
FIG. 4 is a display image on a secondary display showing a record of past winning symbol combinations and respective bonus multipliers if a player's next winning combination is a repeat of one of those past winning combinations.

In one embodiment shown in FIG. 4, the secondary display 13 depicts a record of the past four winning symbol combinations 40*a*, 40*b*, 40*c*, and 40*d* (collectively "40") and respective bonus multipliers 42*a*, 42*b*, 42*c*, and 42*d* if the player's next winning combination is a repeat of one of those four winning combinations 40. The "repeat win" bonus may vary for different winning combinations. For example, if the "repeat win" bonus is a bonus multiplier, the multiplier may vary with the probability of achieving the winning combination such that, for example, the lower the probability of achieving the winning combination, the higher the multiplier. The bonus multiplier for repeating a less probable winning combination of five U.S. MINT symbols 40*d* shown on the secondary display 13 may be a multiplier 42*d* of 20×, while the bonus multiplier for repeating a more probable winning combination of three U.S. MINT symbols 40*a* may be a multiplier 42*a* of 3×. If a current play of the game yields a winning combination that appears more than once on the secondary display, the "repeat win" bonus may enhanced, e.g., repeated by the number of times that the winning combination appears on the display.

Figure 5:
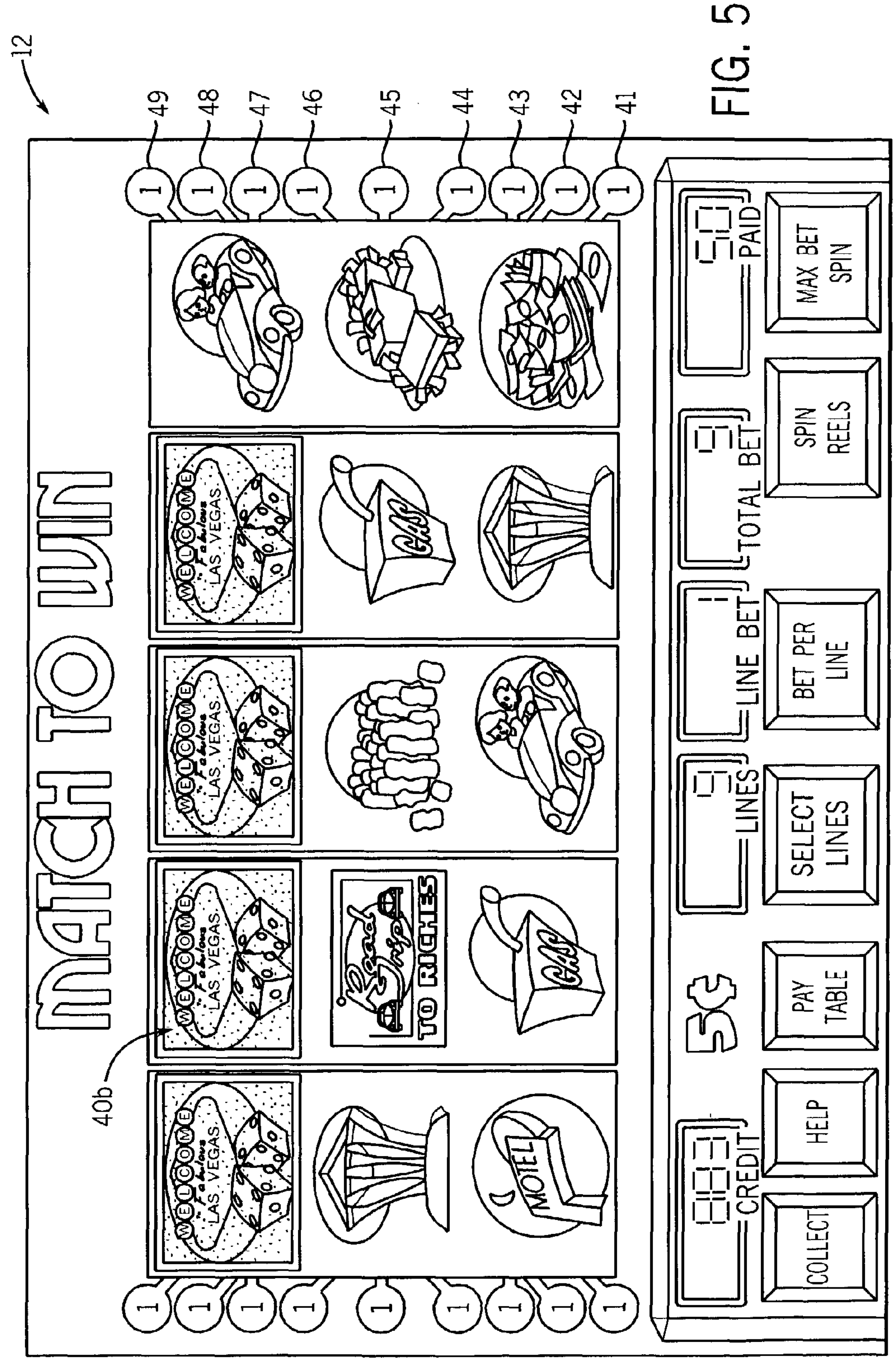
FIG. 5 is a display image on the primary display showing a winning combination of four LAS VEGAS SIGN reel symbols.
Figure 6:
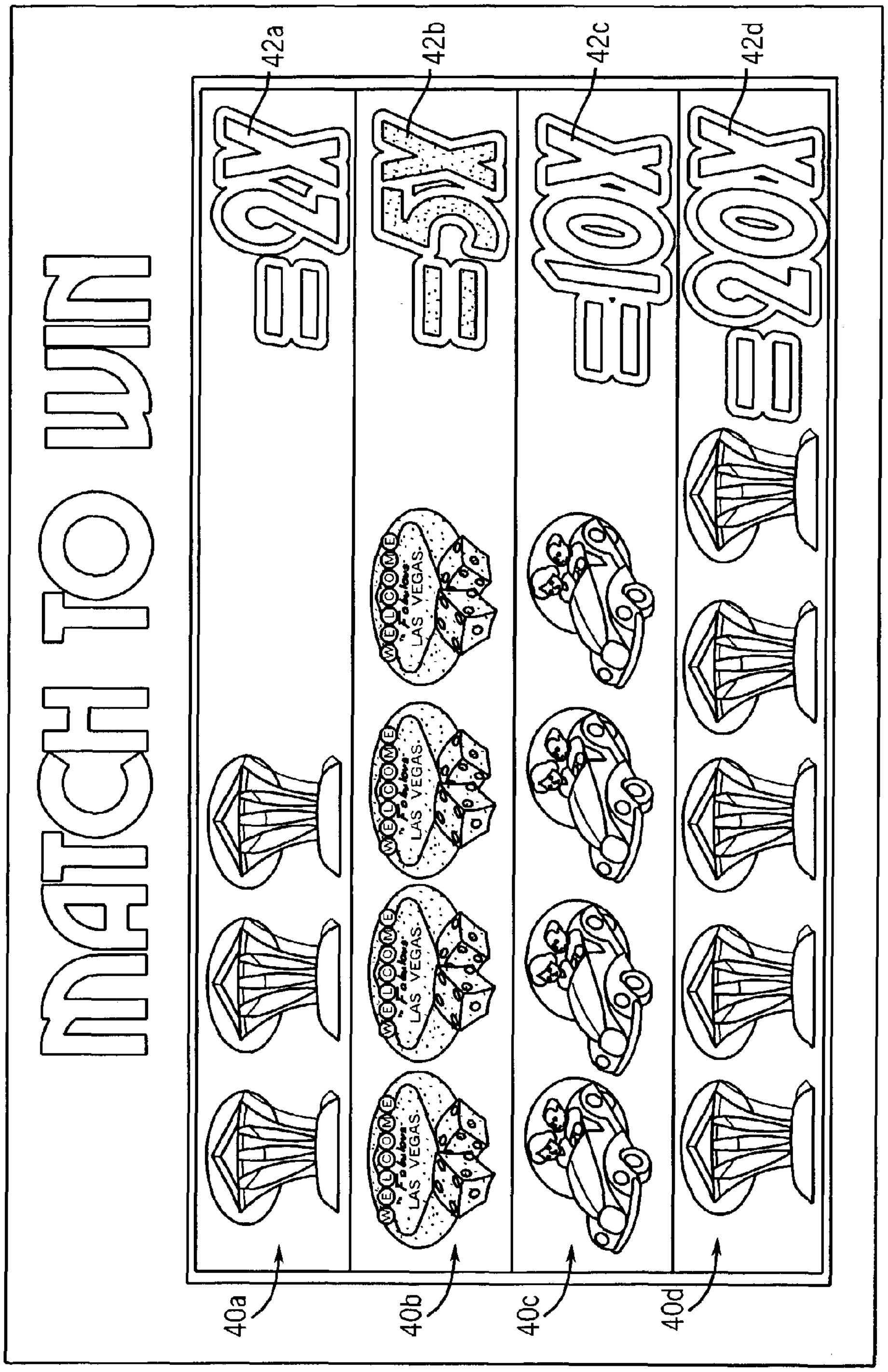
FIG. 6 is a display image on the secondary display showing that the winning combination in FIG. 5 matches one of the past winning combinations shown on the secondary display.
Figure 7:
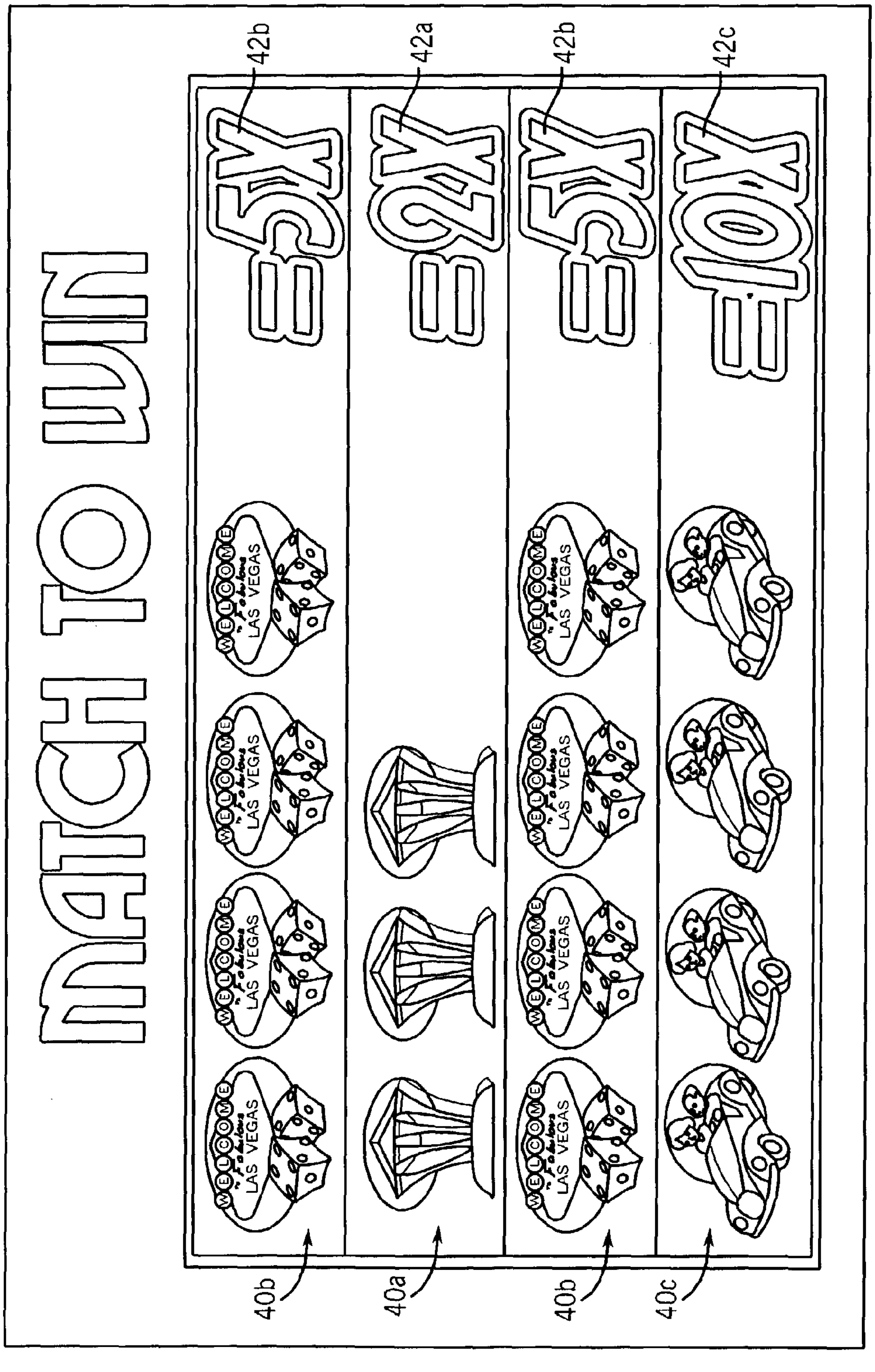
FIG. 7 is a display image on the secondary display showing a revised record of past winning symbol combinations and respective bonus multipliers after removing the oldest of the past winning combinations in FIG. 4 and adding the most recent winning combination in FIG. 5.

In the example illustrated in FIGS. 5, 6, and 7, a current play of the video slot game yields a winning combination of four LAS VEGAS SIGN symbols 40*b* (see FIG. 5). As shown in FIG. 6, this winning combination 40*b* was one of the past four recorded winning combinations and has a "repeat win" bonus multiplier 42*b* of 5×. Therefore, the secondary display 13 highlights the winning combination 40*b* and awards the player with five (5) times the normal payout for the winning combination 40*b*. If the normal payout is 50 credits, the player is awarded 250 credits (i.e., 250 credits=5×50 credits). As shown in FIG. 7, the secondary display 13 removes the oldest (e.g., lowermost combination 40*d* in FIG. 6) of the past four winning combinations from the lower position, shifts the remaining three winning combinations downward to occupy the vacated lower position, and adds the most recent winning combination of four LAS VEGAS SIGN symbols 40*b* to the upper position. Alternatively, the oldest of the past four winning combinations may occupy the upper position such that the secondary display 13 removes the oldest of the past four winning combinations from the upper position, shifts the remaining three winning combinations upward to occupy the vacated upper position, and adds the most recent winning combination to the lower position.

Figure 8:
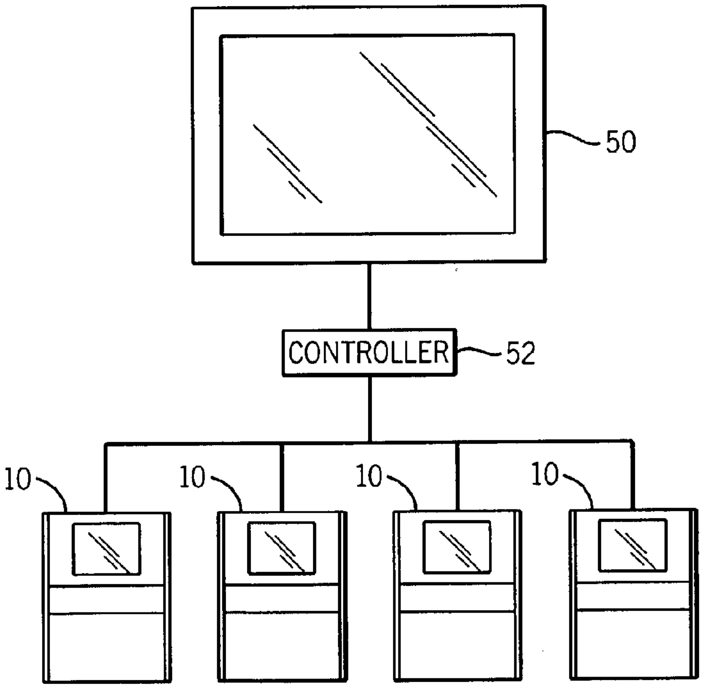
FIG. 8 shows a common history display connected to a bank of gaming machines through a controller.

While the present invention has been described with reference to one or more particular embodiments, those skilled in the art will recognize that many changes may be made thereto without departing from the spirit and scope of the present invention. For example, instead of only tracking past winning outcomes on the secondary display, the history information may track past losing outcomes, any past outcomes (winning or losing), past symbols, or other past events and provide a "repeat event" bonus to the player if a current play yields one of the past events shown on the secondary display. Furthermore, instead of only tracking past winning outcomes for a single machine, the present invention contemplates tracking past winning outcomes for a plurality of machines (e.g., bank of machines) linked to a common secondary display (e.g., bank tracker). Referring to FIG. 8, the common display 50 may, for example, track the past ten winning outcomes that occurred in the plurality of gaming machines 10. The gaming machines 10 are linked to the common display 50 via controller 52. Each of these embodiments and obvious variations thereof is contemplated as falling within the spirit and scope of the claimed invention, which is set forth in the following claims:

What is claimed is:

1. A gaming system comprising:

a history display for displaying a plurality of past outcomes of a wagering game; and a controller for awarding a bonus if a current outcome of the wagering game has a predetermined association with any of the displayed plurality of past outcomes, wherein the displayed plurality of past outcomes are a predetermined number of winning outcomes.

2. The system of claim 1, wherein the predetermined number of winning outcomes include most recent winning outcomes.

3. A gaming comprising:

a history display for displaying a plurality of past outcomes of a wagering game; and a controller for awarding a bonus if a current outcome of the wagering game has a predetermined association with any of the displayed plurality of past outcomes, wherein the wagering game is a reel slot game including symbol-bearing reels that are rotated and stopped to place combinations of symbols in visual association with a display area, and wherein the displayed plurality of past outcomes are one or more of the combinations of symbols.

4. The system of claim 3, wherein the one or more of the combinations of symbols include most recent winning combinations of symbols.

5. A method conducting a wagering game on a wagering game system, comprising providing the wagering game system for playing the wagering game, wherein the wagering game system comprises at least one processor configured to, upon execution of instructions associated with the wagering game, performs the acts of;

displaying, on a display device associated with the wagering game system, a plurality of past outcomes of the wagering game; and awarding a bonus if a current outcome of the wagering game has a predetermined association with any of the displayed plurality of past outcomes, wherein the displayed plurality of past outcomes are a predetermined number of winning outcomes.

6. The method system of claim 5, wherein the predetermined number of winning outcomes include most recent winning outcomes.

7. A method conducting a wagering game on a wagering game system, comprising providing the wagering game system for playing the wagering game, wherein the wagering game system comprises at least one processor configured to, upon execution of instructions associated with the wagering game, performs the act of;

displaying, on a display device associated with the wagering game system, a plurality of past outcomes of the wagering game; and awarding a bonus if a current outcome of the wagering game has a predetermined association with any of the displayed plurality of past outcomes, wherein the wagering game is a reel slot game including symbol-bearing reels that are rotated and stopped to place combinations of symbols in visual association with a display area, and wherein the displayed plurality of past outcomes are one or more of the combinations of symbols.

8. The method of claim 7, wherein the one or more of the combinations of symbols include most recent winning combinations of symbols.

* * * * *

UNITED STATES PATENT AND TRADEMARK OFFICE
CERTIFICATE OF CORRECTION

PATENT NO. : 7,744,453 B2
APPLICATION NO. : 10/375675
DATED : June 29, 2010
INVENTOR(S) : Larry J. Pacey It is certified that error appears in the above-identified patent and that said Letters Patent is hereby corrected as shown below:

| | | Should read |
|---|---|---|
| Column 6<br>Claim 3<br>Line 4 | 3. A gaming comprising: | 3. A gaming "system" comprising: |
| Column 6<br>Claim 5<br>Line 24 | game, performs the acts of | game, perform[[s]] the acts of |
| Column 6<br>Claim 7<br>Line 41 | game, performs the act of | game, perform[[s]] the acts |

Signed and Sealed this

Ninth Day of November, 2010

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,744,453 B2
APPLICATION NO. : 10/375675
DATED : June 29, 2010
INVENTOR(S) : Pacey It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2043 days.

Signed and Sealed this
Twenty-sixth Day of April, 2011

David J. Kappos
*Director of the United States Patent and Trademark Office*